Feb. 18, 1936.  L. EIRICH ET AL  2,031,149
EDGE RUNNER LIKE MIXING AND KNEADING MACHINE
Filed Sept. 21, 1931  2 Sheets-Sheet 1
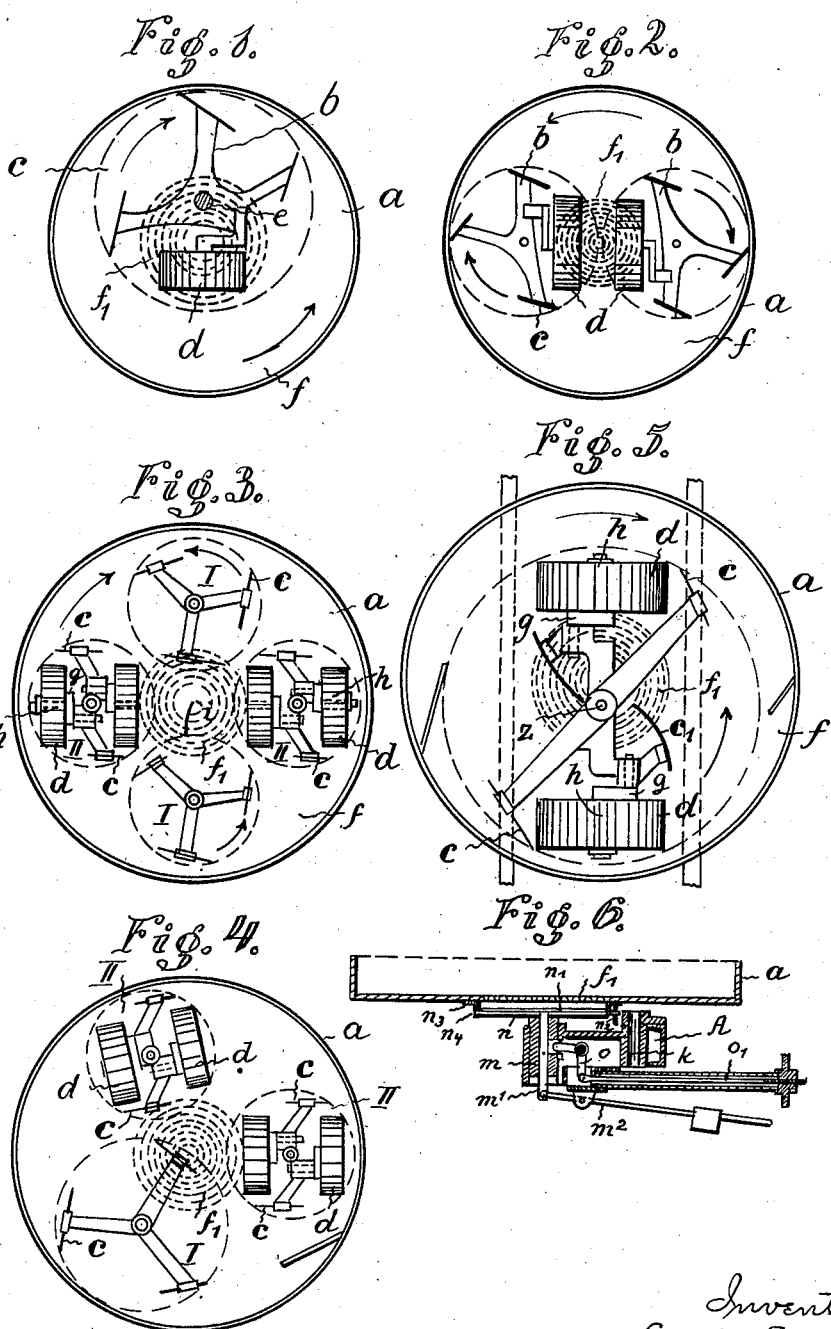

Feb. 18, 1936.   L. EIRICH ET AL   2,031,149
EDGE RUNNER LIKE MIXING AND KNEADING MACHINE
Filed Sept. 21, 1931    2 Sheets-Sheet 2
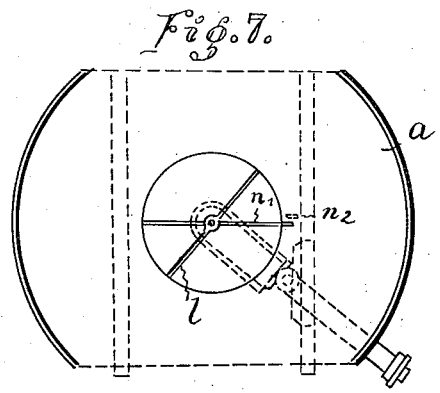
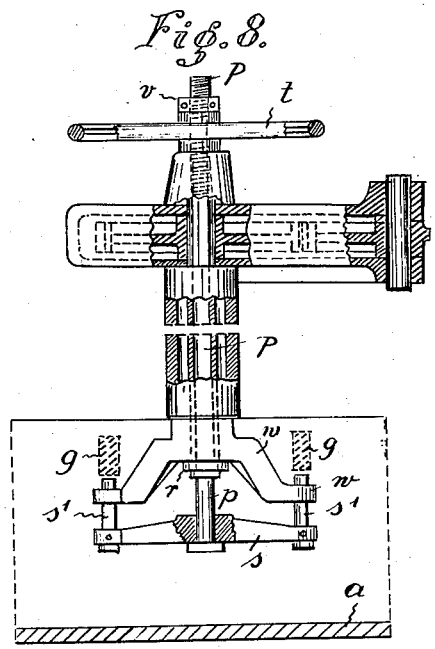
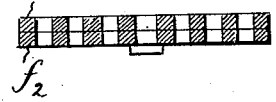
Inventors
Ludwig Eirich
Joseph Eirich
By Sommers & Young Attys.

Patented Feb. 18, 1936

2,031,149

UNITED STATES PATENT OFFICE 2,031,149

EDGE RUNNER-LIKE MIXING AND KNEADING MACHINE

Ludwig Eirich and Joseph Eirich, Hardheim, Baden, Germany

Application September 21, 1931, Serial No. 564,208
In Germany September 27, 1930

12 Claims. (Cl. 83—45)

This invention relates to an edge runner-like grinding and kneading machine with rotating grinding path. To machines of this type a predetermined quantity of mixing material was hitherto supplied, which was then kneaded and mixed in the machine, the whole of finished material being automatically discharged at the same time by opening a discharging device in the plate shaped bottom. The mixing machine, according to the invention serves for the dry preparation of substances of any kind and for kneading moist material besides for mixing any material with dry or liquid additions. The machine may further be used for the treatment of substances, such as mortar, lime, clay, loam, sand, glass and porcelain mass, molding sand and core sand for foundries, ores, foodstuffs such as chocolate and the like, fodder, pigments, cements and pastes, and further for chemical and pharmaceutical products and the like.

It is desirable for such kneading and mixing machine to work continuously, i. e. that material is continuously supplied to the same and the finished material continuously discharged therefrom.

The kneading and mixing machine, according to the invention, is arranged so that it fulfils this requirement.

According to the invention at least one positively driven kneading and mixing tool moves on the grinding path, which is partly solid and partly perforated sieve-like, in the same or in the opposite direction, eccentrically to the middle of the grinding path, said tool being so arranged that it moves alternately over the solid and sieve-like portions of the grinding path or only over the solid portion of the same, whereas the mixing tools feed the material continuously to the sieve-like portion, where it drops through the perforations, if it is of suitable size, the material being otherwise returned by the mixers to the edge runners, to be repeatedly treated. The sieve-like portion of the grinding path may be equipped with arrangements for regulating the quantity of the finished material passing through the perforations, or for temporarily preventing the material from passing through at all. Owing to this arrangement, the machine serves not only for continuously mixing but also for mixing individual charges. As much mixing material can be continually fed to the machine as the sieve bottom will allow to pass through. The size of the sieve perforations depends on the kind of finished mixing to be obtained. The insertable sieves or grids are therefore interchangeably arranged.

The sieve or grid is preferably arranged at the center of the grinding disk, whereas the annular surface, which surrounds the sieve and over which the kneading and mixing tools move, is not perforated. On the solid grinding path, the chief mixing and kneading work is carried out, as here the edge runners move at considerably higher speed than near the plate center, where the plate speed is almost zero. The material is repeatedly conveyed by the mixing tools to the sieve so that the material of sufficient fineness can pass through the sieve and is discharged. The grinding path running on carrying rollers may be arranged horizontally or inclined.

The material may be exposed for a longer or shorter time to the grinding and mixing effect, independently of the width of the holes of the sieve portion, according to whether this sieve at the center of the plate is of greater or smaller diameter, this being for instance effected by the use of interchangeable insertion ring pieces.

By this machine the mixing can be carried out not only continually but also in separate charges. For this purpose the central sieve plate is composed of two similarly perforated plates arranged the one above the other and adapted to be mutually displaced in such a manner, that the sieve holes of the upper plate are completely or partly covered or uncovered by the lower sieve plate.

Below the sieve plate a solid plate with a scraper may be arranged, adapted to be moved up and down. By adjusting the solid plate in vertical direction, the gap on the periphery between the lower edge of the rotating grinding plate and the adjustable bottom plate, through which the material can pass, may be enlarged or reduced or completely closed.

In order to effect in a simple manner a more rapid interchanging of the insertion pieces, for instance the sieve plates, a plate may be arranged under the discharge which has several apertures of the size of the insert pieces to be interchanged. If this plate has two apertures, they are adapted to accommodate the two insertable sieves with holes of different sizes, or one of the apertures to accommodate a solid plate and the other the sieve. If this plate has three apertures, the middle one may serve for holding a solid insertion piece and the outer apertures for holding each a sieve, the holes of the two sieves being of different sizes. The insertion pieces are raised and inserted from below into the discharge opening of the rotating mixing plate, by means of a separate device.

More than three apertures may be provided in the holding plate. Instead of the reciprocating holding plate, a circular table plate with apertures for the insertion pieces might be arranged under the mixing plate so that, when the table is rotating, another insertion piece with perforations of different sizes or a solid insert piece are brought consecutively underneath the discharge. By a lever device, eccentric, or shaft with pinion, the sieve or solid plate may be raised or lowered as soon as it arrives underneath the discharge of the mixing plate or as soon as the corresponding aperture in the table arrives under this discharge so as to receive the sieve or solid plate.

For the arrangement of the kneading and mixing tools on the solid portion and on the perforated portion of the grinding path, various forms of constructions are possible, which will be hereinafter described.

The invention is illustrated diagrammatically in different forms of construction, by way of example, in the accompanying drawings in which:—

Figs. 1–5 show in top plan views different grinding and mixing plates in which the interconnected kneading and mixing tools and mixing tools and mixing scooping tools with scoops are in different positions and arrangements the one relative to the other and relative to the grinding plate.

Fig. 6 is a vertical section through a grinding plate with sieve bottom and closure device for the discharge adapted to be swung out according to the U. S. A. Patent 1,728,598.

Fig. 7 shows in top plan view the grinding plate according to Fig. 6, the sieve being omitted.

Fig. 8 is a vertical section on larger scale through the device for raising and lowering the edge runner.

Fig. 9 is a diagrammatic side sectional view of a pair of superposed sieve plates.

As shown in Fig. 1 a kneading and mixing tool $b$, having mixing vanes $c$ and one or more kneading tools $d$, is arranged eccentrically to the rotating grinding path $a$. The kneading and mixing tool $b$ rotates around its axle $e$ in the opposite direction to that in which the grinding path $a$ rotates, said grinding path consisting of a solid portion $f$ and of a sieve portion $f_1$.

The mixing vanes $c$ and the edge runners $d$ move along the solid portions of the grinding path $a$ as well as over portions of the sieve $f^1$. During this movement the vanes loosen up the material worked by the edge runner $d$ and push the same onto the sieve. The finished material drops through the holes in the sieve or is forced through the holes by the edge runners. The grinding path $a$ may be horizontal or inclined. The sieve may be circular or angular.

Fig. 2 shows two opposite mixing and kneading tools $b$ arranged on the grinding path $a$ and rotating around their axle in opposite direction to that in which the grinding path rotates. The effect is thereby duplicated. The two edge runners $d$ and also the mixing tools $c$ move over the solid portion $f$ and over the sieve-like portion $f^1$ of the grinding path.

Fig. 3 shows on the grinding path $a$ alternately mixing tools I, which carry only mixing vanes $c$, and mixing tools II, which carry several edge runners $d$ with mixing vanes $c$.

The mixing vanes $c$ of the mixing tools I move over the solid ring-shaped portion $f$ of the grinding path and also over portions of the sieve $f^1$. They loosen up the material worked by the kneading tools $d$ and push the same repeatedly towards the sieve until the material of sufficient fineness has dropped through the perforations in the sieve.

The tools II, II have each two mixing vanes $c$ and two edge runners $d$ suspended on studs $h$ of the crank arms $g$ mounted in brackets, so that they can regulate their position according to the thickness of the layer of material. The edge runners $d$, shown in Figs. 1 and 2, are also arranged in this manner. By means of a device, which will be hereinafter described, the crank arm $g$ and the edge runners $d$ can be adjusted in vertical direction and secured in the adjusted position, according to the thickness of the layer of material. As the mixing vanes of the tools I, move only over a portion of the sieve $f^1$, an auxiliary delivering plate $i$ is further arranged at the center of the sieve. This delivering plate $i$ may be omitted if the interconnected edge runners and mixing tools II are arranged, as shown in Fig. 4, on the grinding path $a$, so that they stand at an angle approximately 120° the one relative to the other. On the remaining portion of the grinding path $a$ one single mixing tool I with scoops $c$ is arranged, the diameter of which is so selected, that the scoops $c$ move over the portion extending from the edge of the plate to the center of the grinding path. The material treated on the solid grinding path is loosened up by the scoops $c$ of the tool I and repeatedly fed to the half sieve $f_1$ to be deflected towards the outer side, whereas the scoops $c$ on the tools II move over other portions of the sieve.

According to Fig. 5 one kneading tool III is arranged on the grinding path, the pivot pin $z$ of this kneading tool being mounted in the grinding plate $a$ so that the edge runners $d$ move only on the solid grinding path $a$ turning in opposite directions. Several mixing vanes $c$ mounted on the tool III move over the solid grinding path, whereas the mixing vanes $c_1$ move over the sieve like portion of plate $a$. Machines with a tool III present the advantage that the kneading tools $d$ do not move over the sieve like portion $f$, but only over the solid path. No material is therefore pressed by force through the sieve holes of the plate $f_1$ by means of the kneading tools. The finished material is merely pushed by the scoops $c_1$ onto the sieve portion so that it drops through the holes.

The sieve plates $f_1$ mentioned with reference to Figs. 1–5, are interchangeably fixed in the bottom portion of the grinding plate. In order to work with this machine with continual passing through of the material or with intermittent passing through, i. e. with interposition of mixing and delivering periods of any desired duration, the following arrangement is connected with the sieve plate.

Under the rotatable plate $a$ a closing device, designated as a whole by A, adapted to be oscillated in outward direction is arranged similar as the arrangement disclosed in the U. S. A. Patent No. 1,728,598. The arrangement A is oscillated around a pivot pin $k$.

A bar or rod $l$, Fig. 6, which might have several arms, is arranged underneath the interchangeable sieve plate $f_1$, serves as a scraper, and is fixed to a shaft $m_1$ adapted to be moved up and down in a sleeve $m$. The bar or rod $l$ is pressed against the bottom $f_1$ by the action of a weighted lever $m_2$, hingedly connected to the shaft $m_1$. The material dropping through the sieve drops onto a stationary plate $n$ fixed on the sleeve $m$. On the plate $n$ a scraper $n_1$ is arranged, one arm of which projects beyond the edge of the plate $n$, shown in Fig. 6. The scraper $n_1$ is actuated by a catch $n_2$ on the bottom of plate $a$ so that the material resting on the plate $n$ is pushed in outward direction and delivered through a gap $n_4$ between plate $n$ and the lower edge of a ring $n_3$ of angular cross section.

The width of the gap $n_4$ may be changed as desired by means of an elbow lever $o$ adapted to be adjusted by a screw spindle $o_1$ and hand wheel; or the plate $n$ is pushed upward so far that no material can be discharged. With this object in view it is evidently necessary that the ring $n_3$ of angular cross section have a recess for the projecting arm of the scraper $n_1$. The scraper $n_1$, mounted on shaft $m_1$ is so arranged, that it can freely pass under the scraper $l$. The width of the gap can be altered by raising and lowering of the plate $n$ mounted on the sleeve $m$ so that the machine can be used for continual delivery or as charging mixer.

In order to effect the adjusting of the kneading tool mounted on the crank pin $h$, a screw spindle $p$ is provided, as shown in Fig. 8, extending through the center of the mixer axle $r$ and fitted at the lower end with a transverse bow $s$ engaging under the crank arms $g$ which carry the pins $h$, as indicated in dotted lines in Fig. 8. In the transverse bow $s$ abutment bolts $s_1$ are arranged, on which the crank arms $g$ rest. These bolts $s_1$ extend through guide arms $w$. If the screw spindle $p$ is raised by means of the hand wheel $t$, the transverse bow $s$ with the abutment bolts $s_1$ is moved upwards or downwards, the crank arms $g$ being displaced, whereby the edge runner is more or less lifted off the grinding path or moved towards the same.

The adjusting of the distance between the lower edge of the edge runner and the surface of the mixing plate can be effected not only when the machine is at rest but also during the service, this being necessary for certain kinds of grinding material.

By adjusting the two abutment bolts $s_1$ in the transverse bow $s$ one edge runner can be lifted more than the other, if necessary.

An adjusting nut $v$ made in two parts is arranged on the upper end of the screw spindle $p$.

In Fig. 9 the above mentioned superposed sieve plates are designated by $f_1$ and $f_2$, and they are adapted to be mutually adjusted by rotating one of the plates so that the holes of the upper plate can be partly or completely covered or uncovered by the solid portions between the holes of the lower sieve plate.

We claim:

1. In a mixing and kneading machine, in combination, a rotary grinding plate provided with an exchangeable perforated member in the center thereof, a plurality of rotating mixing and grinding tools eccentrically mounted with relation to the axis of said grinding plate and positioned to cooperate therewith, scraping means positioned beneath said perforated member for scraping said member, and means for adjusting the distance between the mixing and grinding tools and the grinding plate.

2. In a mixing and kneading machine, in combination, a rotary grinding plate provided with an exchangeable perforated member in the center thereof, a single tool comprising edge runners and mixing elements mounted to revolve about an axis eccentric to the axis of the grinding plate, the edge runners of said tool positioned to pass only over the solid portion of said grinding plate and the mixing elements positioned to pass over the solid and perforated portions of said grinding plate.

3. In a mixing and kneading machine, in combination, a rotary grinding plate provided with a perforated member in the center thereof, a vertically shiftable, stationary solid plate under said perforated member, a scraper on said solid plate, means on said rotary grinding plate positioned to rotate said scraper, and a vertically movable scraper beneath the perforated member, positioned for movable contact with the lower side of said member.

4. In a mixing and kneading machine, in combination, a rotary grinding plate provided with perforations in the center thereof, mixing tools above said grinding plate, a hollow vertical shaft carrying said mixing tools, a screw spindle extending through said hollow shaft, an actuating means on the upper end of said screw spindle, a transverse member on the lower end of said screw spindle, and independently adjustable abutment bolts in said transverse member adapted to support said mixing tools.

5. In a mixing and kneading machine, in combination, a rotary grinding plate provided with an exchangeable perforated member in the center thereof, a plurality of rotating mixing and grinding tools eccentrically mounted with relation to the axis of said grinding plate and adapted to cooperate therewith, a vertically shiftable, stationary solid plate under said perforated member, a scraper on said solid plate, means on said grinding plate adapted to rotate said scraper, and a vertically movable scraper positioned beneath said perforated member and having a movable contact with the lower side of said member, a hollow vertical shaft carrying said mixing tools, a screw spindle extending through said hollow shaft, an actuating means on the upper end of said screw spindle, a transverse member on the lower end of said screw spindle, and independently adjustable abutment bolts in said transverse member adapted to support said mixing tools.

6. In a mixing and kneading machine the combination of a rotatable grinding plate provided at the center with an opening for the reception of an insert member, with a rotatable element provided for rotation in a plane parallel to the plane of the rotatable grinding plate; the rotatable element having mixing and grinding tools and being arranged eccentrically to the rotatable grinding plate, the opening of the grinding plate having, as an insert member, a screen plate, a vertically adjustable, rigid, solid plate below the screen plate, a scraper on the solid plate, means on the grinding plate for turning the scraper, and a vertical scraper, movable up and down, below the screen plate.

7. In a mixing and kneading machine the combination recited in claim 6, wherein the said grinding tools are mounted so that they act only on the solid part of said grinding plate, while the mixing tools act on the solid and perforated part of the grinding plate.

8. In a mixing and kneading machine the combination recited in claim 6, provided with means to vary the distance between the kneading tools and the grinding plate.

9. In a mixing and kneading machine the combination of a rotatable grinding plate provided at the center with a perforation for the reception of an insert member, with a rotatable element mounted for rotation in a plane surface parallel to the rotational plane of the grinding plate, mixing and kneading tools above the grinding plate, a hollow vertical shaft which carries said tools, a screw spindle which passes through the hollow shaft and drive means at the upper end of the spindle, a transverse member at the lower end of the spindle, and independently adjustable bearing bolts which carry the kneading tools.

10. In a mixing and kneading machine, in combination, a rotary grinding plate provided with an exchangeable perforated member in the center thereof, two kneading tools mounted to revolve about an axis eccentric to the axis of rotation of said grinding plate and positioned to roll only over the solid portion of said grinding plate, and a mixing tool extending to the center of said grinding plate and mounted to revolve about an axis eccentric to the axis of rotation of the grinding plate, and positioned to pass over the entire area of the said plate.

11. In a mixing and kneading machine the combination of a rotatable grinding plate provided with an opening at the center for the reception of an insert member, with a rotatable element adapted for rotation in a plane parallel to the rotational plane of the grinding plate, means for positioning the rotatable element eccentrically to the rotatable grinding plate, grinding tools provided on said rotatable element spaced from the axis thereof and so positioned that they act only on the solid part of the grinding plate, and mixing tools provided on the rotatable element spaced from the axis thereof so that they act on both the solid and perforated parts of the grinding plate, said grinding and mixing tools revolving about an axis eccentric to the axis of the grinding plate.

12. In a mixing and kneading machine, the combination of a plate mounted for rotation and being provided with a central opening, an interchangeable insert comprising a screen plate in said opening, a plurality of units journalled for rotation over said grinding plate about axes eccentric to the axis of the rotatable plate, said units being provided with kneading and mixing members, the path of said mixing members passing over the screen plate.

LUDWIG EIRICH.
JOSEPH EIRICH.